US009410808B2

(12) United States Patent
Park et al.

(10) Patent No.: US 9,410,808 B2
(45) Date of Patent: Aug. 9, 2016

(54) APPARATUS AND METHOD FOR DETECTING LOCATION INFORMATION USING NAVIGATION ALGORITHM (75) Inventors: Kyong-Ha Park, Suwon-si (KR);
Chan-Gook Park, Seoul (KR);
Hyun-Su Hong, Seongnam-si (KR);
Sung-Min Park, Seoul (KR);
Seung-Hyuck Shin, Seoul (KR)

(73) Assignees: Samsung Electronics Co., Ltd., Suwon-si (KR); Seoul National University R & DB Foundation, Seoul (KR)

( * ) Notice: Subject to any disclaimer, the term of this patent is extended or adjusted under 35 U.S.C. 154(b) by 190 days.

(21) Appl. No.: 13/978,616

(22) PCT Filed: Jan. 4, 2012

(86) PCT No.: PCT/KR2012/000065
§ 371 (c)(1),
(2), (4) Date: Jul. 8, 2013

(87) PCT Pub. No.: WO2012/093842
PCT Pub. Date: Jul. 12, 2012

(65) Prior Publication Data
US 2013/0282275 A1    Oct. 24, 2013

(30) Foreign Application Priority Data
Jan. 7, 2011    (KR) .................. 10-2011-0001990

(51) Int. Cl.
*G01C 21/00*    (2006.01)
*G01S 19/47*    (2010.01)

(52) U.S. Cl.
CPC .............. *G01C 21/00* (2013.01); *G01S 19/47* (2013.01)

(58) Field of Classification Search
None
See application file for complete search history.

(56) References Cited

U.S. PATENT DOCUMENTS

| 6,132,391 | A | 10/2000 | Onari et al. |
| 6,516,021 | B1 | 2/2003 | Abbott et al. |
| 7,266,378 | B2 | 9/2007 | Norta et al. |
| 7,627,450 | B2 | 12/2009 | Lee et al. |
| 8,370,064 | B1 * | 2/2013 | Li ..................... G01C 21/165 701/479 |
| 2005/0125141 | A1 * | 6/2005 | Bye ............................ 701/200 |
| 2006/0184320 | A1 | 8/2006 | Hong |
| 2007/0118286 | A1 | 5/2007 | Wang et al. |
| 2010/0097268 | A1 | 4/2010 | Roh |
| 2010/0198511 | A1 | 8/2010 | Hunter et al. |

FOREIGN PATENT DOCUMENTS

| CN | 1818559 A | 8/2006 |
| EP | 2 112 472 A2 | 10/2009 |
| KR | 10-2001-0113370 A | 12/2001 |
| KR | 10-2002-0001257 A | 1/2002 |
| KR | 10-2007-0021872 A | 2/2007 |
| KR | 10-0827076 B1 | 5/2008 |
| WO | 00/48014 A2 | 8/2000 |

* cited by examiner

*Primary Examiner* — Thomas Tarcza
*Assistant Examiner* — Garrett Evans
(74) *Attorney, Agent, or Firm* — Jefferson IP Law, LLP (57) ABSTRACT A method and apparatus for detecting location information using a navigation algorithm are provided. The method includes searching for neighboring Global Positioning System (GPS) satellites, receiving, if at least one GPS satellite is detected, pseudo-range information from at least one of the detected GPS satellites and storing the received pseudo-range information, calculating a displacement of a pedestrian terminal based on step detection of a pedestrian, correcting the calculated displacement of the pedestrian terminal using the received pseudo-range information, and measuring the location of the pedestrian terminal is measured using the corrected displacement.

15 Claims, 6 Drawing Sheets

APPARATUS AND METHOD FOR DETECTING LOCATION INFORMATION USING NAVIGATION ALGORITHM

PRIORITY

This application is a National Stage application under 35 U.S.C. §371 of an International application filed on Jan. 4, 2012 and assigned application No. PCT/KR2012/000065, and claims the benefit under 35 U.S.C. §365(b) of a Korean patent application filed on Jan. 7, 2011 in the Korean Intellectual Property Office and assigned Serial No. 10-2011-0001990, the entire disclosure of which is hereby incorporated by reference.

BACKGROUND OF THE INVENTION

1. Field of the Invention

The present invention relates to detection of location information about a user. More particularly, the present invention relates to an apparatus and method for detecting location information about a user using a radio navigation system and a pedestrian navigation system.

2. Description of the Related Art

Personal navigation systems have been designed to provide person-centered route guidance. Such systems locate a pedestrian to be route-guided and guide the pedestrian to a route based on his or her location. Personal navigation systems can be classified into a satellite navigation system, an inertial navigation system, a pedestrian navigation system, and the like, according to movement types.

A satellite navigation system can provide information about a current location and a route to a desired destination to a user using satellites. An example of a satellite navigation system is a car navigation system.

A car navigation system locates a vehicle, provides the vehicle's driver with an optimum route, and guides the driver along the optimum route. In general, a car navigation system calculates the current location of the vehicle using a Global Positioning System (GPS) sensor and provides route guidance from the current location to a destination.

An inertial navigation system calculates the acceleration of a user by means of an accelerometer such as a gyroscope sensor, calculates the current velocity of the user based on the acceleration, and detects the current location of the user based on the velocity. The inertial navigation system is applied mainly to a submarine, an aircraft, a missile, etc. Recently, route guidance has been provided to vehicles or aircrafts using a composite navigation system having an accelerometer in addition to the satellite navigation system.

A pedestrian navigation system provides pedestrian-centered route guidance; not car-centered route guidance. Although the pedestrian navigation system is similar to the car navigation system, the former measures the location of a route-guidance object more accurately and provides more detailed route guidance than the latter because the route-guidance object is a pedestrian, which is slower than a car.

Accordingly, the car navigation system and the pedestrian navigation system provide route guidance using different algorithms. For example, the navigation system locates a car using a Global Positioning System (GPS) sensor, whereas the pedestrian navigation system locates a pedestrian by detecting the pedestrian's steps and strides. Therefore, these two navigation systems should each have dedicated navigation devices for performing their own algorithms.

However, in a case where both a car navigation device and a pedestrian navigation device are necessary, a user must purchase both navigation devices, resulting in increased cost and less portability. In this context, a composite navigation device has recently been developed to enable the car navigation system and the pedestrian navigation system to be used together.

A shortcoming with the composite navigation device is that a user should manually switch an operation mode between the car navigation system and the pedestrian navigation system. That is, to use the pedestrian navigation system while using the car navigation system, the user must end the car navigation system manually and then activate the pedestrian navigation system, or vice versa.

Therefore, navigation devices of the related art inconveniently require a user to manually select the car navigation system or the pedestrian navigation system. Moreover, if the user selects a wrong navigation system by mistake, incorrect route guidance may be provided to the user.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above mentioned problems and/or disadvantages and to provide at least the advantages described below. Accordingly, an aspect of the present invention is to provide an apparatus and method for detecting the location of a user, automatically using car navigation or pedestrian navigation selectively or both the car navigation and pedestrian navigation in combination without user manipulation in a composite navigation device that provides a car navigation system and a pedestrian navigation system.

In accordance with an aspect of the present invention, a method for measuring a location of a pedestrian terminal is provided. The method includes searching for neighboring Global Positioning System (GPS) satellites, receiving, if at least one GPS satellite is detected, pseudo-range information from at least one of the detected GPS satellites and storing the received pseudo-range information, calculating a displacement of a pedestrian terminal based on a detected number of steps taken by a pedestrian, correcting the calculated displacement of the pedestrian using the received pseudo-range information, and measuring the location of the pedestrian terminal using the corrected displacement.

In accordance with another aspect of the present invention, the displacement calculation includes calculating the displacement of the pedestrian terminal by a Pedestrian Dead Reckoning (PDR) algorithm that estimates a location of a pedestrian terminal according to gait characteristics of the pedestrian.

In accordance with another aspect of the present invention, the displacement correction includes confirming the displacement of the pedestrian terminal by a pedestrian navigation system, calculating the distance between the pedestrian terminal and the at least one GPS satellite using the calculated displacement of the pedestrian terminal and orbit information about the at least one GPS satellite, and correcting the displacement of the pedestrian terminal using a difference between the received pseudo-range information and the calculated distance between the pedestrian terminal and the at least one GPS satellite.

In accordance with another aspect of the present invention, the reception and storing of pseudo-range information includes receiving the pseudo-range information from the at least one of the detected GPS satellites, detecting and correcting an error of the received pseudo-range information using a filter, and storing the corrected pseudo-range information In accordance with another aspect of the present invention, an apparatus for measuring a location of a pedestrian terminal is provided The apparatus includes a user interface for interfacing with a user, a GPS receiver for searching for neighboring GPS satellites and for receiving, if at least one GPS satellite is detected, pseudo-range information from at least one of the detected GPS satellites, and a controller for calculating a displacement of a pedestrian terminal based on a detected number of steps taken by a pedestrian, for correcting the calculated displacement of the pedestrian terminal using the received pseudo-range information, and for measuring the location of the pedestrian terminal using the corrected displacement.

In accordance with another aspect of the present invention, the controller calculates the displacement of the pedestrian terminal by a PDR algorithm that estimates a location of a pedestrian terminal according to gait characteristics of the pedestrian.

In accordance with another aspect of the present invention, the controller confirms the displacement of the pedestrian terminal by a pedestrian navigation system, calculates a distance between the pedestrian terminal and the at least one GPS satellite using the calculated displacement of the pedestrian terminal and orbit information about the at least one GPS satellite, and corrects the displacement of the pedestrian using a difference between the received pseudo-range information and the calculated distance between the pedestrian terminal and the at least one GPS satellite.

In accordance with another aspect of the present invention, the apparatus further includes a filter unit for detecting and correcting an error of the received pseudo-range information.

In accordance with another aspect of the present invention, the controller controls selective coupling of two navigation algorithms or uses only one of the two navigation algorithms according to the number of GPS signals received through the GPS receiver.

In accordance with another aspect of the present invention, the apparatus may further include an accelerometer for measuring an acceleration of the apparatus according to a motion of the apparatus.

In accordance with another aspect of the present invention, the controller may include a satellite navigation algorithm executor for receiving information about a location of a user from a visible satellite and providing information about the location of the user, and a PDR algorithm executor for estimating a location of a user according to gait characteristics of the user.

In accordance with another aspect of the present invention, if the number of GPS signals received through the GPS receiver is 4 or larger, the controller uses a loosely coupled scheme in which a location and velocity of the GPS receiver are used as measurements for a coupled system.

In accordance with another aspect of the present invention, if the number of GPS signals received through the GPS receiver is 3 or smaller, the controller compares strengths of the GPS signals with a threshold, and if the strengths of the GPS signals are higher than the threshold, the controller uses a tightly coupled scheme in which pseudo-range information and pseudo-range change rate information received through the GPS receiver are used as measurements.

In accordance with another aspect of the present invention, if no GPS signal is received through the GPS receiver, the controller detects location information about the user using one of two navigation algorithms, one of the two navigation algorithms being the PDR algorithm.

In accordance with another aspect of the present invention, at least one non-transitory processor readable medium is provided for storing a computer program of instructions configured to be readable by at least one processor for instructing the at least one processor to execute a computer process for performing the methods herein.

As is apparent from the above description of the present invention, in a composite navigation device that provides a satellite navigation system and a PDR system, a car navigation system and a pedestrian navigation system are automatically used selectively or in combination, without a user's manipulation. Therefore, accurate location information about a user can be provided in an environment where the car navigation system cannot provide the location information about the user.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which:

FIGS. 4A to 5B are graphs illustrating filter tuning results obtained by taking into account gait characteristics according to exemplary embodiments of the present invention.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention use a Pedestrian Dead Reckoning (PDR) system. The PDR system estimates the location of a user based on the gait characteristics of the user. Because a general integrated navigation system model is not viable, it is essential to derive a model specialized for the PDR. Exemplary embodiments of the present invention provide a method for coupling the PDR system with a satellite navigation system using the features of the PDR system, examples of such features being step detection, stride length estimation, and heading estimation regarding a pedestrian.

According to exemplary embodiments of the present invention, the two navigation systems (i.e., the PDR system and the satellite navigation system) can be loosely coupled or tightly coupled. Depending on the reception state of a Global Positioning System (GPS) signal, the two systems may be coupled in a different manner. A composite navigation system with the two systems coupled within it should consider information output from each system on the same coordinate system.

That is, the PDR system may provide a location on a local horizontal coordinate system, whereas the satellite navigation system may provide a location on an Earth-Centered Earth-Fixed (ECEF) coordinate system. Therefore, the two different coordinate systems may be converted using an appropriate coordinate conversion matrix.

An exemplary embodiment of a navigation device that selectively couples the two systems may have the following configuration.

Figure 1:
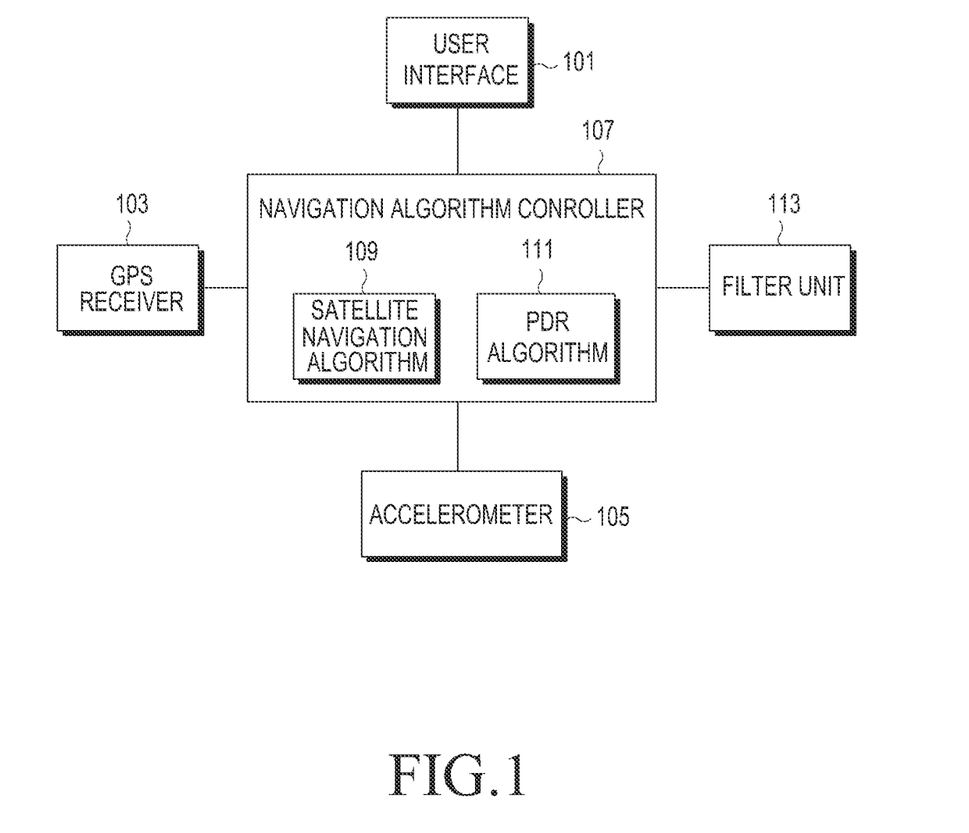
FIG. 1 is a block diagram of a navigation device according to an exemplary embodiment of the present invention.

FIG. 1 is a block diagram of a navigation device according to an exemplary embodiment of the present invention.

Referring to FIG. 1, the navigation device includes a user interface 101, a GPS receiver 103, an accelerometer 105, a navigation algorithm controller 107, and a filter unit 113. The navigation algorithm controller 107 includes a satellite navigation algorithm 109 and a PDR algorithm 111.

Referring to FIG. 1, the user interface 101 may be configured with an input device such as a keypad, a touch panel, or the like for interfacing with a user. For instance, the user interface 101 may receive a request for executing a navigation program from the user and may provide the request to the navigation algorithm controller 107.

The GPS receiver 103 receives a GPS signal from a GPS satellite and transmits the received GPS signal to the navigation algorithm controller 107. The GPS receiver 103 may receive one or more GPS signals which may include position information and time information. In addition, the GPS receiver 103 may receive information about a pseudo-range from at least one satellite. The accelerometer 105 may be a 3-axis accelerometer and may measure an acceleration according to a motion of the navigation device. The accelerometer 105 may measure the acceleration of the navigation device according to the motion of the navigation device using an acceleration sensor.

The filter unit 113 may detect an error in an acceleration of the navigation device based on a motion of the navigation device measured by a specific filter and an error between a measured current location of the navigation device and a destination, and may correct the error. That is, when an actual location and an estimated location are different, the error between the actual and an estimated location may be detected and corrected so that the estimated location is as accurate to the actual location as possible. In an exemplary embodiment of the present invention, a Kalman filter may be used.

The navigation algorithm controller 107 may include the satellite navigation algorithm 109 and the PDR algorithm 111 and may control selective coupling of the two algorithms 109 and 111, or may use only one of the two algorithms 109 and 111 by counting the number of GPS signals received from the GPS receiver 103. For example, when four or more GPS signals are received, the satellite navigation algorithm 109 and the PDR algorithm 111 may be coupled loosely in such a manner that the satellite navigation algorithm 109 is a main algorithm, and the PDR algorithm 111 is an auxiliary algorithm.

In exemplary embodiments, a loosely coupled scheme may be used in most cases. Such a system may use the location and velocity of a GPS receiver for measurement. Despite the advantage of having a simple configuration, a loosely coupled scheme can provide information about a user's location only if the number of visible satellites is 4 or larger.

In another example, if three or fewer GPS signals are received, the navigation algorithm controller 107 may estimate a location and heading by tightly coupling the satellite navigation algorithm 109 with the PDR algorithm 111 such that information about a current location, a velocity, and a heading of a user using the navigation device, as obtained by the PDR algorithm 111, may be used together with satellite information received through the GPS receiver 103.

Figure 6:
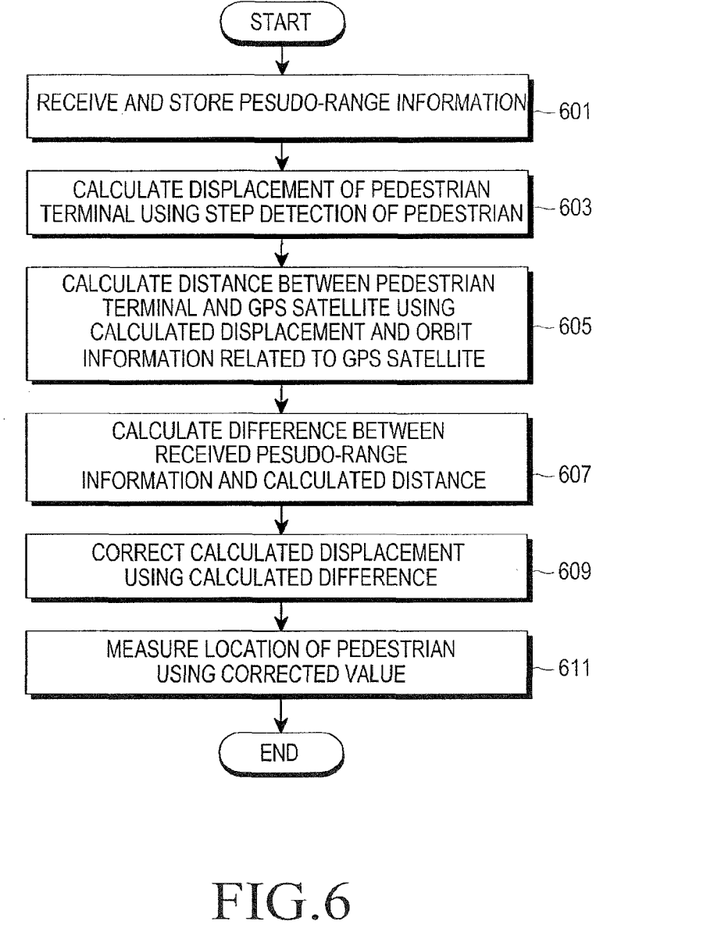
FIG. 6 is a flowchart illustrating an operation for measuring a location of pedestrian terminal according to an exemplary embodiment of the present invention.

Referring to FIG. 6, according to exemplary embodiments of a tightly coupled scheme, neighboring GPS satellites may be detected through the GPS receiver 103. Pseudo-range information may be received from at least one of the detected GPS satellites, the received pseudo-range information may be stored in step 601, a displacement of a pedestrian (a displacement of a pedestrian terminal) may be calculated using step detection of the pedestrian in step 603 and corrected using the received pseudo-range information in step 609, and the location of the pedestrian 1 may be measured using a corrected value in step 611.

In exemplary embodiments, the displacement of the pedestrian may be calculated by the PDR algorithm that estimates the location of a pedestrian using the gait characteristics of the pedestrian.

In exemplary embodiments, in step 609, the displacement of the pedestrian may be corrected by calculating the distance between the pedestrian terminal and a GPS satellite from which the pseudo-range information has been received, using a calculated displacement of the pedestrian and using orbit information related to the GPS satellite in step 605, and calculating the difference between the distance between the pedestrian terminal and a GPS satellite and the received pseudo-range information in step 607.

In exemplary embodiments, the tightly coupled scheme may use pseudo-range information received at the GPS receiver 103 and may use pseudo-range change rate information for measurements. As long as one or more visible satellites exist, the tightly coupled scheme can provide location information about a user.

An operation for providing location information about a user in the navigation device having the above-described configuration will be described below.

Figure 2:
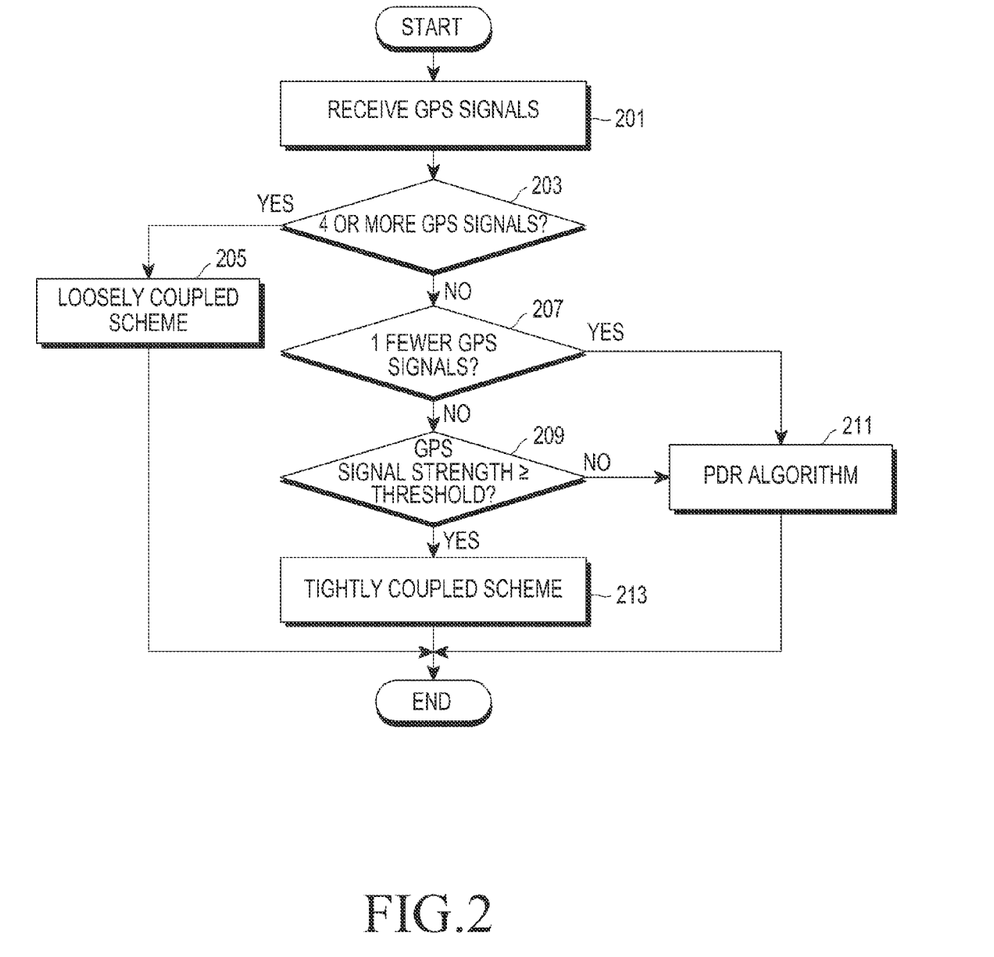
FIG. 2 is a flowchart illustrating an operation for notifying the location of a user using the navigation device according to an exemplary embodiment of the present invention.

FIG. 2 is a flowchart illustrating an operation for notifying the location of a user using the navigation device according to an exemplary embodiment of the present invention.

Referring to FIG. 2, the navigation device receives a GPS signal from the GPS receiver 103 in step 201. If the navigation device is located in a poor reception area, it may not receive any GPS signal. On the other hand, if the navigation device is located in an area with good GPS reception, it may receive a plurality of GPS signals.

In step 203, the navigation device determines whether the number of GPS signals received through the GPS receiver 103 is 4 or larger because the satellite navigation algorithm 109 may be coupled with the PDR algorithm 111 in a different manner according to the number of received GPS signals.

If the number of GPS signals received through the GPS receiver 103 is 4 or larger, the navigation device determines that it is currently located in an area where GPS signals are actively received and goes to step 205. In step 205, the navigation device loosely couples the satellite navigation algorithm 109 with the PDR algorithm 111 and receives information about a current location and travelling route of the navigation device according to the loosely coupled scheme.

On the other hand, if the number of GPS signals received through the GPS receiver 103 is 3 or smaller, the navigation device determines that it is currently located in a poor reception area where GPS signals cannot be actively received and goes to step 207. In step 207, the navigation device determines whether the number of received GPS signals is smaller than 1.

If the number of received GPS signals is smaller than 1, the navigation device determines that no GPS signal is received and goes to step 211. In step 211, the navigation device estimates the location and heading of the user, using the PDR algorithm 111 only, without the satellite navigation algorithm 109.

If the number of received GPS signals is 1 or larger, the navigation device compares the strength of a received GPS signal with a threshold in step 209. If the strength of the received GPS is equal to or lower than the threshold, the navigation device estimates the location and heading of the user using the PDR algorithm 111 only in step 211. If the strength of the received GPS is higher than the threshold, the navigation device estimates the current location and heading of the navigation device by tightly coupling the satellite navigation algorithm with the PDR algorithm 111 in step 213. With the tightly coupled algorithms, the location error of the user can be corrected even when the user is located in a poor reception area where 4 or fewer satellite signals are received.

Figure 3:
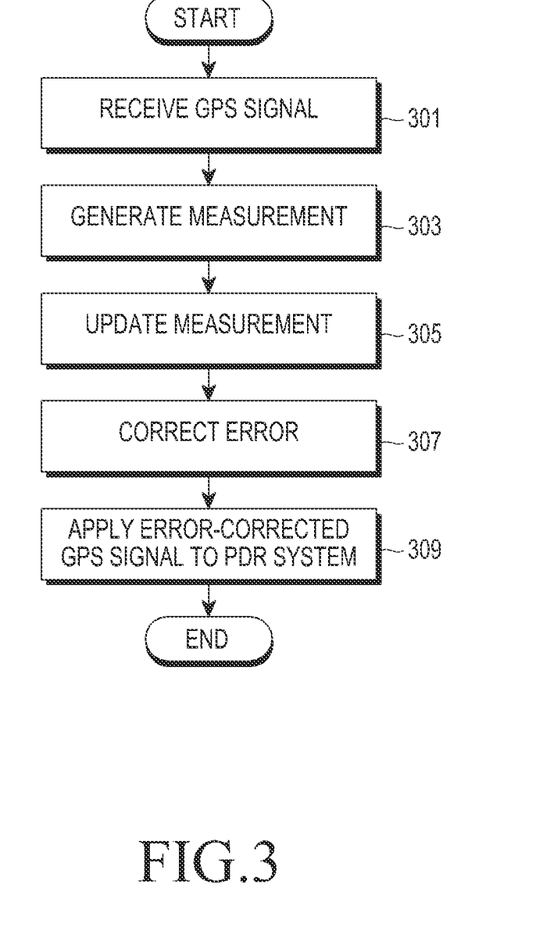
FIG. 3 is a flowchart illustrating an error correction operation according to an exemplary embodiment of the present invention.

FIG. 3 is a flowchart illustrating an error correction operation according to an exemplary embodiment of the present invention.

In exemplary embodiments of the present invention, a Kalman filter may be used. The Kalman filter may be used to obtain an optimum estimate of a state variable and may be applied to a linear system that has a linear structure and minimizes the error variance of an estimated state variable.

Referring to FIG. 3, the navigation device receives a GPS signal in step 301. The received GPS signal is transmitted to the Kalman filter. In step 303, the Kalman filter generates a measurement using the received GPS signal. Since the GPS signal carries pseudo-range information and pseudo-range change rate information, the Kalman filter uses the pseudo-range information and pseudo-range change rate information in generating the measurement. Then, a state variable measurement is updated with the generated measurement in step 305. Specifically, a gain of the Kalman filter is calculated and the state variable measurement is updated using the gain. An error of the GPS signal is corrected using the updated state variable measurement in step 307 and the error-corrected GPS signal is applied to the PDR system in step 309.

In accordance with an exemplary embodiment of the present invention, an error of a reference value is expressed as a state variable of a Kalman filter, and using the Kalman filter an estimated state variable is fed back as an input to the system. This is called indirect feedback. That is, the error propagation characteristics of the system are maintained linearly by use of the indirect feedback Kalman filter. The step for calculating an estimate at the Kalman filter is divided into measurement update performed when a measurement is given and time propagation calculated with passage of time. In exemplary embodiments of the present invention, an error of the system may be corrected through feedback of an error state variable estimated by measurement updating to the system. Thus, the time propagation of the state variable on a system model is not performed after the feedback. Rather, the state variable of the Kalman filter is reset to 0 and measurement updating using a measurement is repeated in the next step.

The below-described graphs illustrate estimates of a current location or destination of a user that uses a navigation device in a composite navigation system that tightly couples the PDR system with the satellite navigation system. In the case of the tightly coupled scheme, a location error of the satellite navigation system is corrected using a Kalman filter.

FIGS. 4A to 5B are graphs illustrating filter tuning results obtained by taking into account gait characteristics according to exemplary embodiments of the present invention.

Figure 4A:
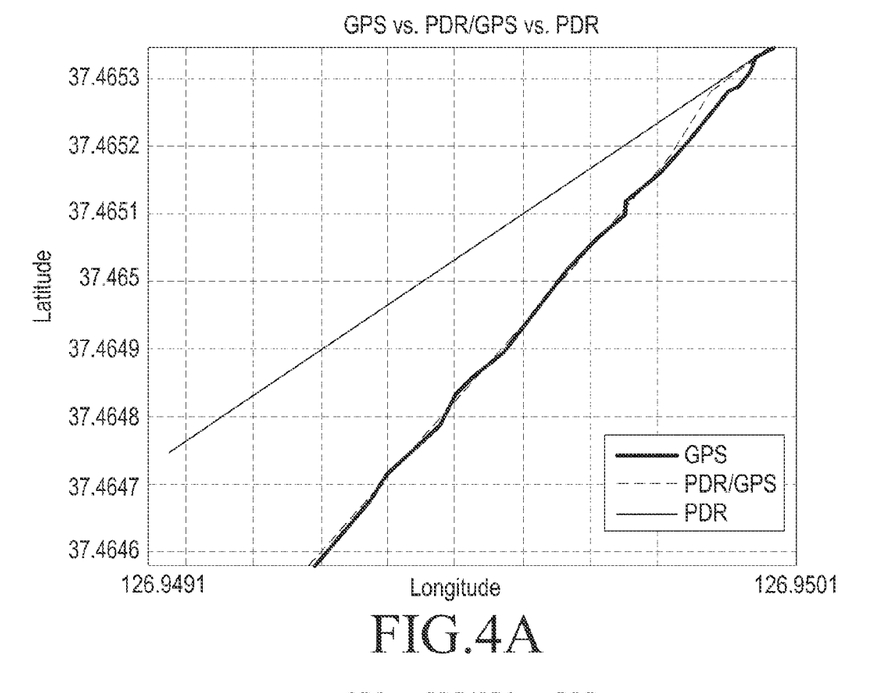
Figure 4B:
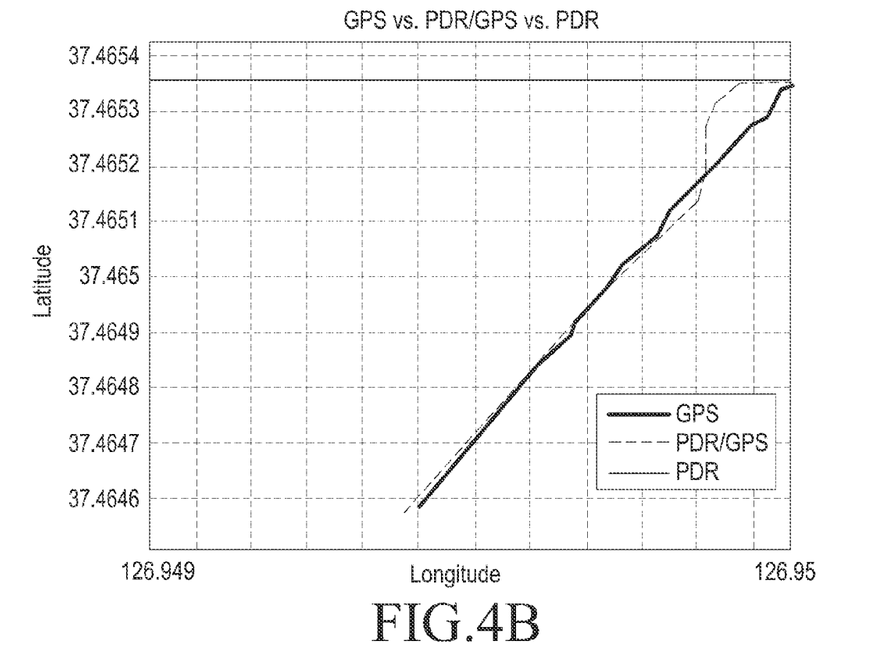
Figure 5A:
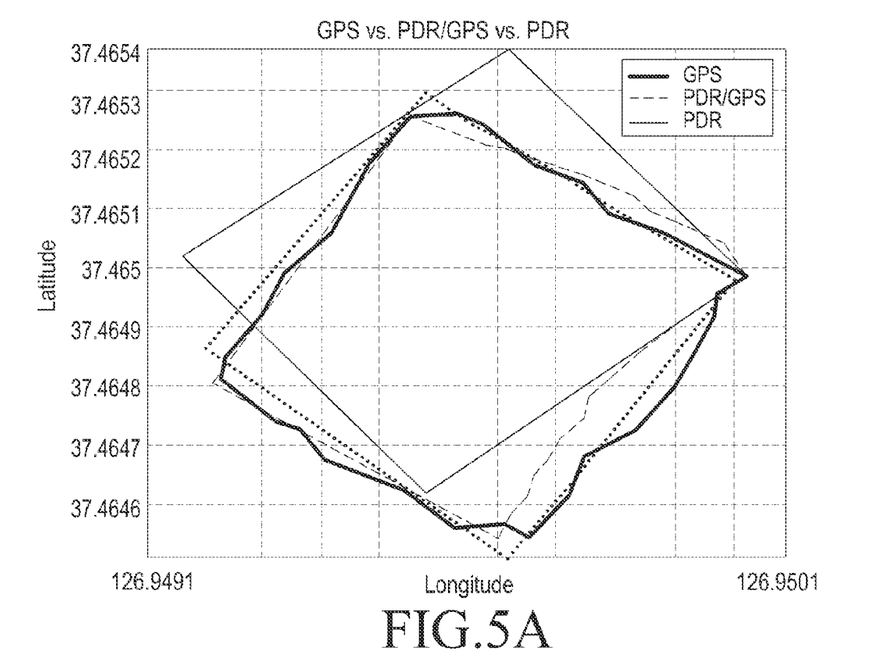
Figure 5B:
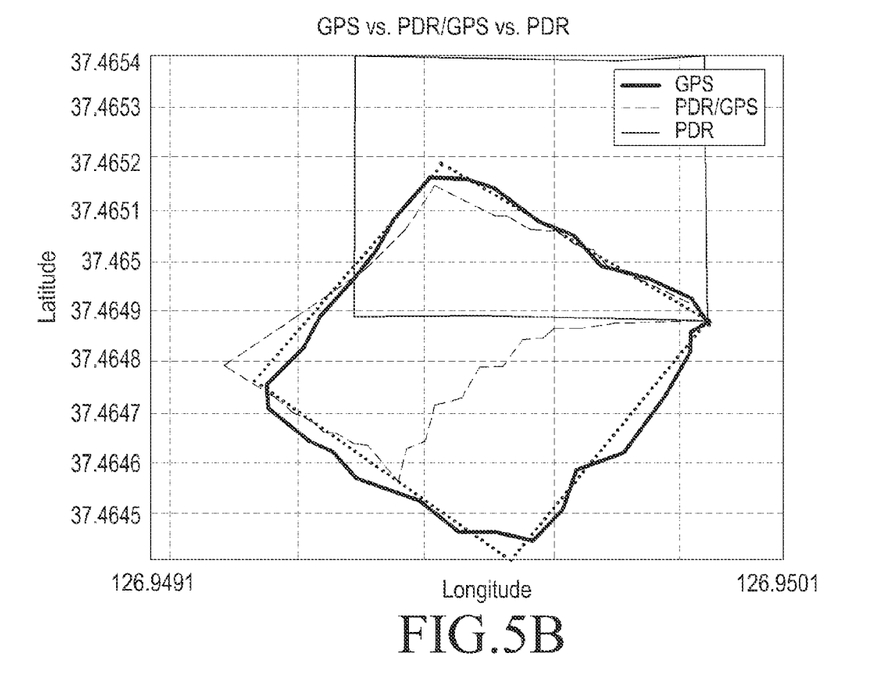

Referring to FIGS. 4A and 4B, graphs are shown illustrating filter tuning results obtained by taking into account gait characteristics on a straight trajectory. Referring to FIGS. 5A and 5B, graphs are shown illustrating filter tuning results obtained by taking into account gait characteristics on a moving trajectory.

It can be noted from FIGS. 4A to 5B that GPS data approximates with respect to an actual trajectory may be tracked successfully irrespective of a heading bias error.

At this point should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the following claims and their equivalents.

The invention claimed is:

1. A method for measuring a location of a pedestrian terminal, the method comprising:
   receiving pseudo-range information from at least one of Global Positioning System (GPS) satellite and storing the received pseudo-range information;
   calculating a displacement of a pedestrian terminal based on a detected number of steps taken by a pedestrian;
   calculating a distance between the pedestrian terminal and the at least one GPS satellite using the calculated displacement of the pedestrian terminal and orbit information about the at least one GPS satellite;
   correcting the calculated displacement of the pedestrian terminal using a difference between the received pseudo-range information and the calculated distance; and
   measuring the location of the pedestrian terminal using the corrected displacement.

2. The method of claim 1, wherein the displacement calculation comprises calculating the displacement of the pedestrian terminal by a Pedestrian Dead Reckoning (PDR) algorithm that estimates a location of a pedestrian terminal according to gait characteristics of the pedestrian.

3. The method of claim 1, wherein the reception and storing of pseudo-range information comprises receiving the pseudo-range information from the at least one of the detected GPS satellites, detecting and correcting an error of the received pseudo-range information using a filter, and storing the corrected pseudo-range information.

4. An apparatus for measuring a location of a pedestrian terminal, the apparatus comprising:
   a user interface configured to interface with a user;
   a Global Positioning System (GPS) receiver configured to:
      receive pseudo-range information from at least one of the GPS satellites; and
   a controller configured to:
      calculate a displacement of a pedestrian terminal based on a detected number of steps taken by a pedestrian,
      calculate a distance between the pedestrian terminal and the at least one GPS satellite using the calculated displacement of the pedestrian terminal and orbit information about the at least one GPS satellite,
      correct the calculated displacement of the pedestrian using a difference between the received pseudo-range information and the calculated distance, and
      measure the location of the pedestrian terminal using the corrected displacement.

5. The apparatus of claim 4, wherein the controller is configured to calculate the displacement of the pedestrian terminal by a Pedestrian Dead Reckoning (PDR) algorithm that estimates a location of a pedestrian according to gait characteristics of the pedestrian.

6. The apparatus of claim 4, further comprising a filter unit configured to detect and correct an error of the received pseudo-range information.

7. The apparatus of claim 4, wherein the controller is configured to control selective coupling of two navigation algorithms or to use only one of the two navigation algorithms according to the number of GPS signals received through the GPS receiver.

8. The apparatus of claim 4, further comprising an accelerometer to measure an acceleration of the apparatus according to a motion of the apparatus.

9. The apparatus of claim 4, wherein the controller comprises:
   a satellite navigation algorithm executor configured to:
      receive information about a location of a user from a visible satellite, and
      provide information about the location of the user; and
   a PDR algorithm executor configured to estimate a location of a user according to gait characteristics of the user.

10. The apparatus of claim 4, wherein, if the number of GPS signals received through the GPS receiver is 4 or larger, the controller is configured to use a loosely coupled scheme in which a location and velocity of the GPS receiver are used as measurements for a coupled system.

11. The apparatus of claim 4,
   wherein, if the number of GPS signals received through the GPS receiver is 3 or smaller, the controller is configured to compare strengths of the GPS signals with a threshold, and
   wherein, if the strengths of the GPS signals are higher than the threshold, the controller is configured to use a tightly coupled scheme in which pseudo-range information and pseudo-range change rate information received through the GPS receiver are used as measurements.

12. The apparatus of claim 5, wherein, if no GPS signal is received through the GPS receiver, the controller is configured to detect location information about the user using one of two navigation algorithms, one of the navigation algorithms being the PDR algorithm.

13. The method of claim 3, wherein the filter is a Kalman filter.

14. The apparatus of claim 6, wherein the filter unit comprises a Kalman filter.

15. At least one non-transitory processor readable medium for storing a computer program of instructions configured to be readable by at least one processor for instructing the at least one processor to execute a computer process for performing the method as recited in claim 1.

* * * * *